(12) United States Patent
Norikane et al.

(10) Patent No.: US 6,522,781 B1
(45) Date of Patent: Feb. 18, 2003

(54) PARTICLE IMAGE ANALYZER

(75) Inventors: Masatomo Norikane, Kobe (JP); Masayuki Katayama, Miki (JP)

(73) Assignee: Sysmex Corporation, Kobe (JP)

( * ) Notice: Subject to any disclaimer, the term of this patent is extended or adjusted under 35 U.S.C. 154(b) by 0 days.

(21) Appl. No.: 09/455,466

(22) Filed: Dec. 6, 1999

(30) Foreign Application Priority Data

Dec. 10, 1998 (JP) .......................................... 10-377845

(51) Int. Cl.$^7$ ................................................. G06K 9/46
(52) U.S. Cl. ...................... 382/203; 250/574; 356/39; 356/73; 382/129; 382/133
(58) Field of Search .......................... 382/129, 133–134, 382/203; 356/23, 39, 73, 335, 417; 250/573–576; 600/462–468

(56) References Cited

U.S. PATENT DOCUMENTS

| | | | | |
|---|---|---|---|---|
| 5,548,395 A | * | 8/1996 | Kosaka | .......................... 356/73 |
| 5,721,433 A | * | 2/1998 | Kosaka | ........................ 250/573 |
| 5,824,269 A | | 10/1998 | Kosaka et al. | |
| 5,921,934 A | * | 7/1999 | Teo | ............................. 600/648 |

FOREIGN PATENT DOCUMENTS

| | | |
|---|---|---|
| JP | 8-136439 | 3/1996 |
| JP | 8-178826 | 7/1996 |

* cited by examiner

*Primary Examiner*—Bhavesh Mehta
*Assistant Examiner*—Gregory Desire
(74) *Attorney, Agent, or Firm*—Shinjyu Global IP Counselors, LLP

(57) ABSTRACT

A particle image analyzer that facilitates display by designating on a distribution an image desired to be displayed from among a large number of recorded images is disclosed. The particle image analyzer is provided with a parameter computation means for computing at least one characterizing parameter for respective particle images obtained by image capture; a storing means for storing correlations between the particle images and the characterizing parameters with regard to the respective particle images; distribution-diagram generation means for generating characteristic-parameter distribution diagram; designation means for designating the area within the distribution diagram; read-out means for reading out from the memory means particle images corresponding to characterizing parameters within the areas designated by the designation means; and display means for displaying the read-out particle images.

16 Claims, 5 Drawing Sheets

Fig. 4

| Particle No. | Image | Particle Dia. | Circularity | Surface Area | Perimetric Length |
|---|---|---|---|---|---|
| 1 | G1(x,y) | D1 | C1 | S1 | L1 |
| 2 | G2(x,y) | D2 | C2 | S2 | L2 |
| 3 | G3(x,y) | D3 | C3 | S3 | L3 |
| . | . | . | . | . | . |
| . | . | . | . | . | . |
| . | . | . | . | . | . |
| n | Gn(x,y) | Dn | Cn | Sn | Ln |

PARTICLE IMAGE ANALYZER

BACKGROUND OF THE INVENTION

1. Technical Field

The present invention relates particle image analyzers that seek information concerning particle size and shape by analyzing particle images.

2. Description of Related Art

In controlling the quality of fine ceramic, toner, pigment and abrasive powders, measuring and controlling particle diameter of the powders is extremely important. With recent advances in development and merchandizing of higher value-added powders, measurement of not only particle size but also shape parameters, as well as their quality control has become important. Moreover, maintaining quality in powder products necessitates measuring large particles and the aggregation of particles.

Herein, a particle image analyzer is known (Japan Laid-Open Pat. 08-136439) that within a flow cell transforms a particle-containing sample liquid into a sample flow by surrounding it with a sheath liquid. Sequentially capturing images of the sample flow and analytically processing the particle images obtained, the analyzer computes and displays a distribution diagram for particle diameter and shape parameters. The analyzer meanwhile enables computing the percentage of cohered particles by batch-displaying pictures of the imaged particles and classifying the particles. On the other hand, a flow cytometer is known (Japan Laid-Open Pat. 08-178826) that, based on signals from particles in a first flow region of a sample flow that flows down a sheath-flow cell, generates a distribution diagram for characteristic parameters of the various particles. The flow cytometer captures particles in a second flow region of the sample flow, and by designating coordinates in the distribution diagram, can display desired images.

Nevertheless, with the particle image analyzer in the former instance, it is difficult to display a desired image from among the large number of stored images. Furthermore, with the flow cytometer in the latter instance, particle images cannot be displayed by designating morphologically characterizing parameters.

SUMMARY OF THE INVENTION

The invention came about considering such circumstances, and an object therefore is to provide a particle image analyzer that facilitates displaying particle images by designating the particles on a distribution diagram for morphologically characterizing parameters.

A particle image analyzer of the present invention is characterized in that it is provided with: parameter computation means for computing at least one morphologically characterizing parameter for respective particle images obtained by image capture; storing means for storing particle images, morphologically characterizing parameters, and correlations between the particle images and the morphologically characterizing parameters with regard to the respective particle images; distribution-diagram generation means for generating a distribution diagram for morphologically characterizing parameters; designation means for designating an area within the distribution diagram; read-out means for reading out from the storing means particle images corresponding to morphologically characterizing parameters within the areas designated by the designation means; and display means for displaying the read-out particle images.

Morphologically characterizing parameters herein are parameters obtained by analyzing particle images. Parameters that can be employed include a particle diameter parameter indicating particle size, a circularity parameter indicating plus/minus roundness of the particles, and an aspect ratio (major/minor axis ratio) parameter indicating a vertical/horizontal ratio of the particles.

The distribution diagram may be a histogram (one-dimensional distribution diagram) wherein the parameter is a single of the morphologically characterizing parameters, or a scattergram (two-dimensional distribution diagram) wherein the parameters are a plurality, for example two, of the morphologically characterizing parameters.

The particle image analyzer preferably is also provided with a distribution analyzing means for analyzing distribution status of the morphologically characterizing parameters within the area designated by the designation means. Analyzing by the distribution analyzing means includes statistical analysis; and for example, with regard to particle diameter, circularity or aspect ratio, is the computation of analytical data such as arithmetic mean, standard deviation, coefficient of variation, median, mode, and 10%, 50% and 90% percentiles (cumulative percentages). Herein, "percentile" indicates a value that is equivalent to cumulative percent when the cumulative frequency is taken to be 100%.

The particle image analyzer preferably is moreover provided with a classifying means for appending to the respective particle images classification information indicating particle status (such as primary particle, secondary particle and the aggregation of particles).

The respective particle images can be obtained by sequentially capturing particles on glass slides with a combined microscope and image-capturing device. Alternatively, the image pictures may be obtained from a particle image analyzer (Japan Laid-Open Pat. 08-136439) that obtains particle pictures by transforming a particle-containing sample liquid into a sample flow by surrounding it with a sheath liquid within a flow cell, and sequentially captures images of the sample flow.

The particles herein may be fine ceramic, toner, pigment, and abrasive and like industrial powders, and also may be particles such as erythrocytes, cells from cell cultures, microorganisms and plankton.

The parameter computation means for computing morphologically characterizing parameters for respective particle images obtained by image capture; the storing means for storing correlations between the particle images and the morphologically characterizing parameters with regard to the respective particle images; the distribution-diagram generation means for generating morphologically characterizing parameter distribution diagrams; the read-out means for reading out from the memory means particle images corresponding to morphologically characterizing parameters within the area designated by the designation means; the distribution analyzing means; and the classifying means can be configured in a image-processing circuit as well as a computer made up of a CPU, ROM, RAM and I/O port, or in a personal computer having image-processing functions.

The designation means for designating the area within the distribution diagram, furthermore, can designate by numerical value designations for the characterizing parameters and by enclosing the distribution diagram interior in arbitrary shapes, for which using a keyboard, mouse or like input means is preferable.

A display device such as a CRT or a liquid-crystal display, or a printing apparatus such as printer can be utilized as the display means for displaying the read-out particle images.

The present invention configured as above succeeds in facilitating display, since a user designates on a distribution diagram an image that the user desires to put up from among numerous stored images.

The foregoing and other objects, features, aspects and advantages of the present invention will become more apparent from the following detailed description in conjunction with the accompanying drawings.

BRIEF DESCRIPTION OF THE DRAWINGS

FIG. 4 is an explanatory diagram illustrating a characterizing parameter data set for an embodiment;

DETAILED DESCRIPTION OF THE PREFERRED EMBODIMENTS

Figure 1:
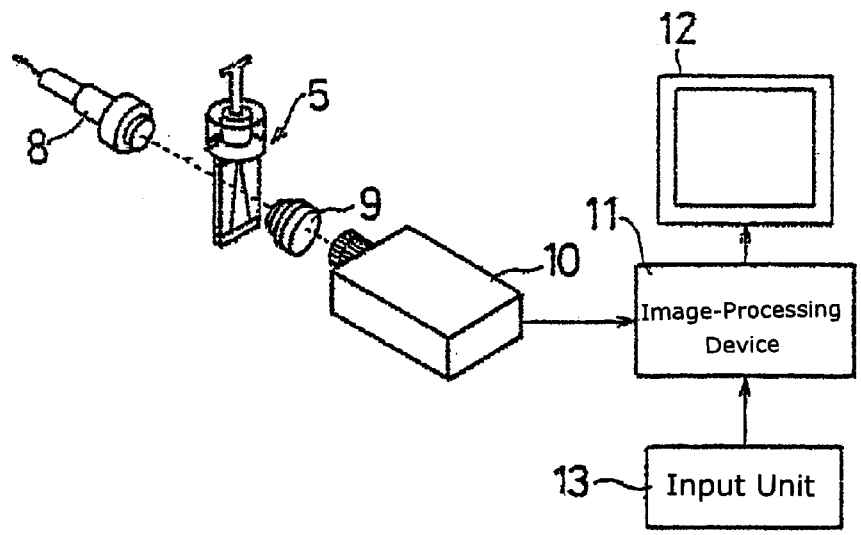
FIG. 1 is a configurational explanatory diagram of the present invention.
Figure 2:
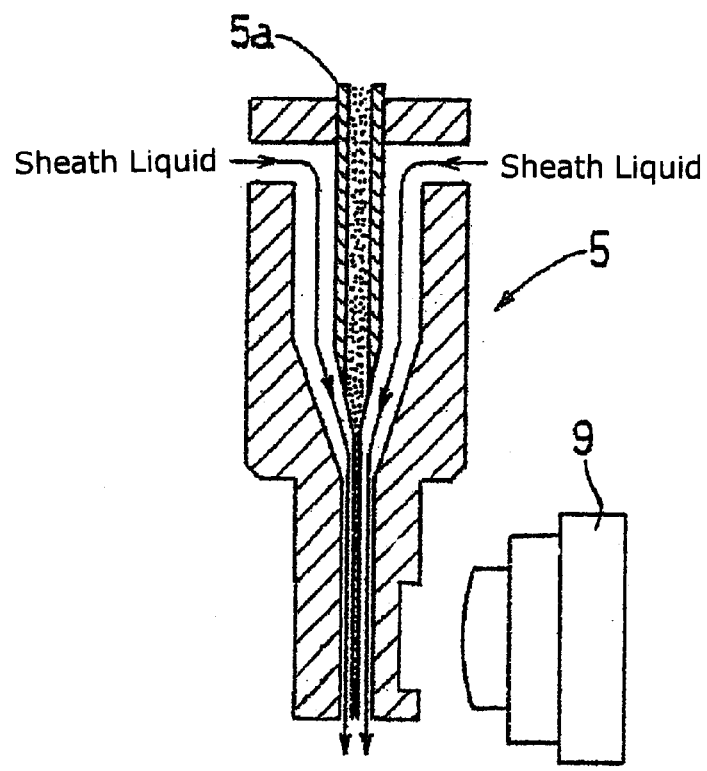
FIG. 2 is an expanded view of a flow cell section.

The configuration of an embodiment of a particle image analyzer of the present invention is illustrated in FIGS. 1 and 2. The particle image analyzer in the present embodiment is equipped with a flow-type particle image-capturing device. The particle image-capturing device includes a flow cell 5, a strobe 8, an objective lens 9, and a video camera 10. A liquid into which a sample has been dispersed is introduced into the flow cell 5, and the sample liquid is forced out of a sample nozzle 5a at a constant flow volume. Concurrently, a sheath liquid is also sent through the flow cell 5. The sample liquid is encircled by the sheath liquid, and, as shown in FIG. 2, is hydro-dynamically squeezed flat in flowing through the flow cell 5. In FIG. 2, the sample liquid flows into a flat stream spreading in the direction of the obverse-reverse faces of the sheet, and narrowing in the transverse (right/left) direction.

By irradiating a pulsed beam from the strobe 8 periodically every 1/30 sec. onto the sample liquid stream thus squeezed flat, the video camera 10 captures still images of the particles via the objective lens 9 every 1/30 sec.

An image-processing device 11 processes image signals from the video camera 10, which are then displayed on a television monitor 12. An input unit 13 is a keyboard or mouse for carrying out various input/command operations.

The image signals herein are sent by a direct-signal cable to the image-processing device 11, or else are supplied to the image-processing device 11 after being once stored in a recording medium.

Figure 3:
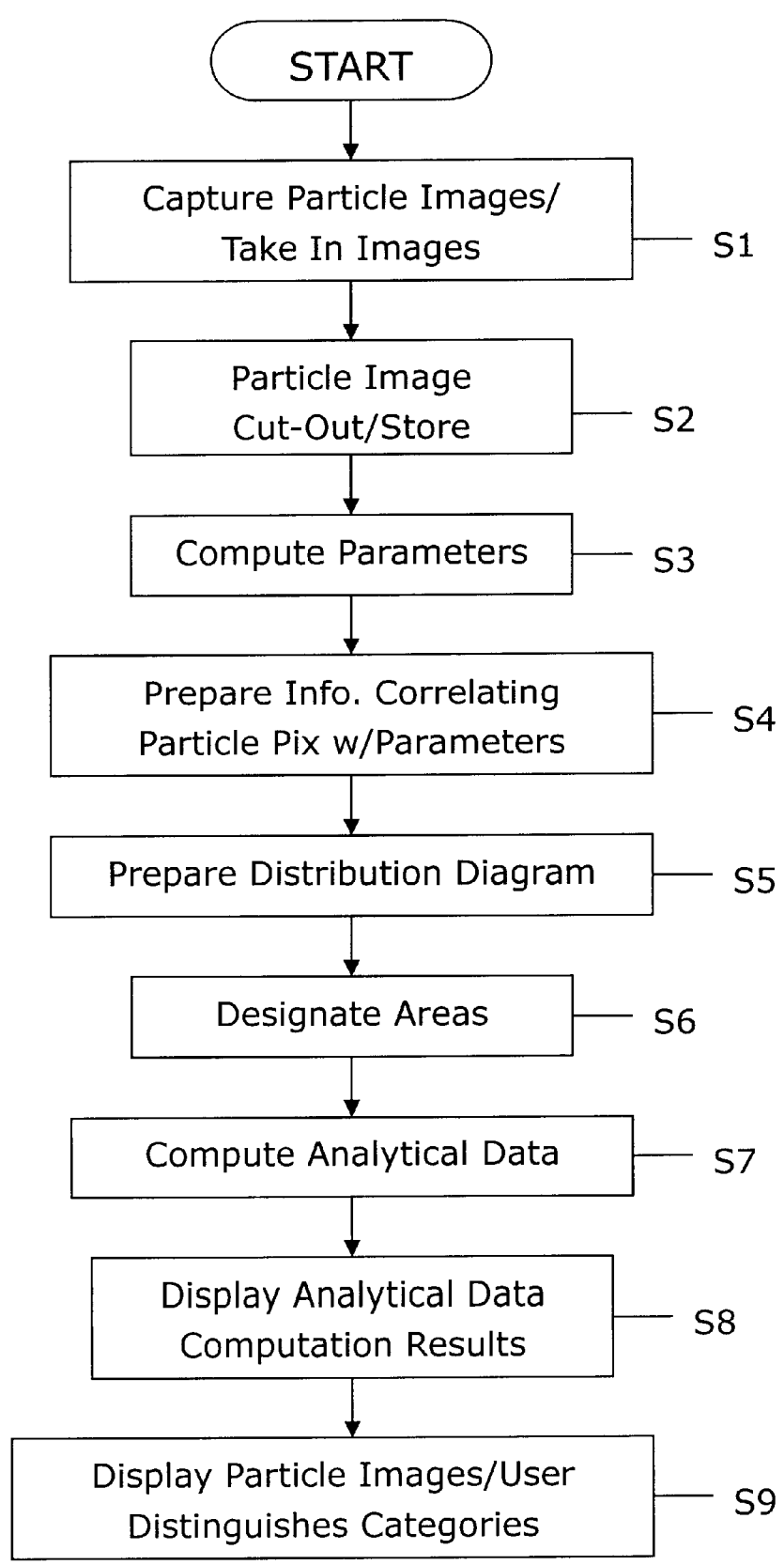
FIG. 3 is a flowchart diagramming an image process.

An image-processing procedure (S1–S9) carried out by the image-processing device 11 on the respective particle images obtained by image capture is shown in FIG. 3.

The image signal is taken into the image-processing device 11 and A/D converted as the image data (step S1).

The image data is next cut out to a predetermined size and stored as particle images in an image memory of the image-processing device 11 (step S2).

Processing the particle image data in the image-processing device carries out computation of morphologically characterizing parameters of surface area, perimetric length, aspect ratio, particle diameter and circularity step S3). Image-processing software generally on the market can be used for computation of the characterizing parameters in this case.

When the characterizing parameters for the respective particle images are thus computed, correlating information linking the parameters with the particle pictures stored in the image memory is prepared as a data set such as FIG. 4 illustrates (step S4). As shown in FIG. 4, particle pictures Gn (x, y) corresponding to respective particle numbers n, and the characterizing parametric values particle diameter Dn, circularity Cn, surface area Sn, and perimetric length Ln likewise corresponding to the respective particle numbers n, are stored as correlating information.

Next, the required distribution diagram (histogram or scattergram) is prepared and displayed (step S5).

Then, designating with the input unit 13 desired morphologically characterizing parameter areas within the distribution diagram (step S6) computes values expressing distribution for the morphologically characterizing parameters that correspond to the designated area, and displays the analysis results (steps S7, S8). That is, the image-processing device 11 effects display of analytical data computation results for arithmetic mean, standard deviation, coefficient of variation, median, mode, and 10%, 50% and 90% percentile values. These statistical analyses facilitate grasping characteristics of the particles overall.

Next, based on the correlating information illustrated in FIG. 4, particle images that correspond to the designated 5 areas are read out from the image memory in the image-processing device 11 and displayed (step S9).

Figure 5:
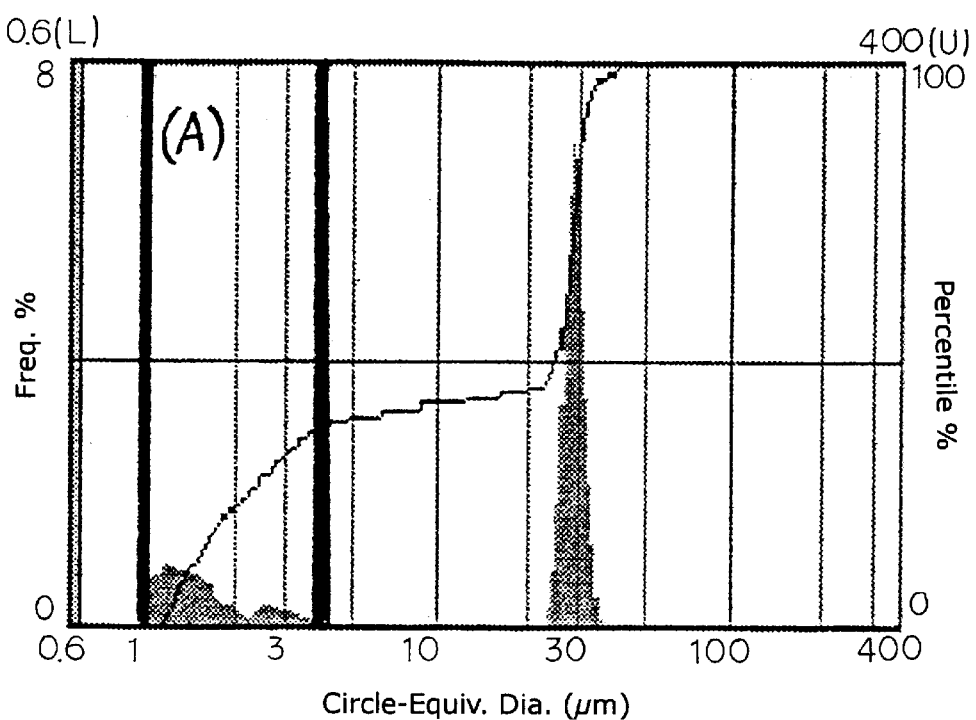
FIG. 5 is an example of a histogram generated in the embodiment based on characterizing parameters.

FIG. 5 shows a distribution diagram (histogram) displayed as a result of measuring alumina particles. The FIG. 5 distribution diagram is generated based on particle diameter (circle-equivalent diameter) as a morphologically characterizing parameter. The area (A) bounded within the bold line in the distribution diagram indicates a designated area. The analytical results wherein analytical area (A) is designated distinguish a distribution area in which mean particle diameter (arithmetic mean)=2.25, particle diameter SD (standard deviation)=1.40, and 50% diameter (50% percentile)=1.71, and in which small particles of greatly dispersed particle diameter (circle-equivalent diameter) are concentrated.

Figure 6:
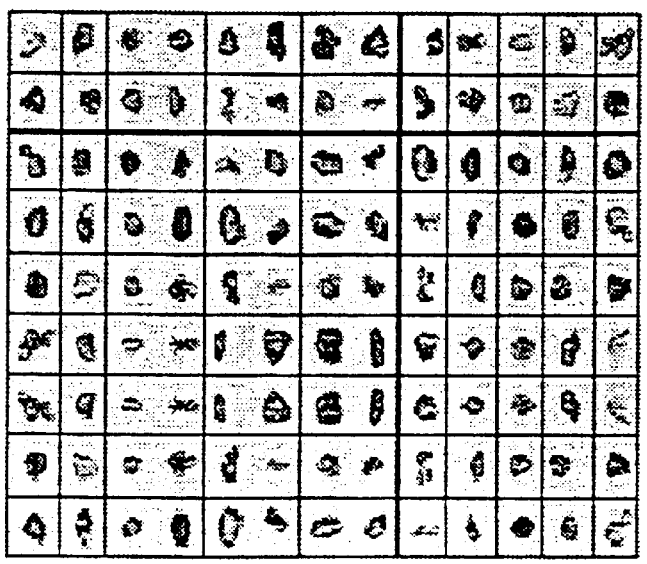
FIG. 6 depicts particle pictures from area (A) in the embodiment.

FIG. 6 depicts particle pictures that are displayed when area (A) in FIG. 5 is designated. It is clear that in accordance with the selected histogram particle pictures in which particle diameter is small are exhibited most.

Figure 7:
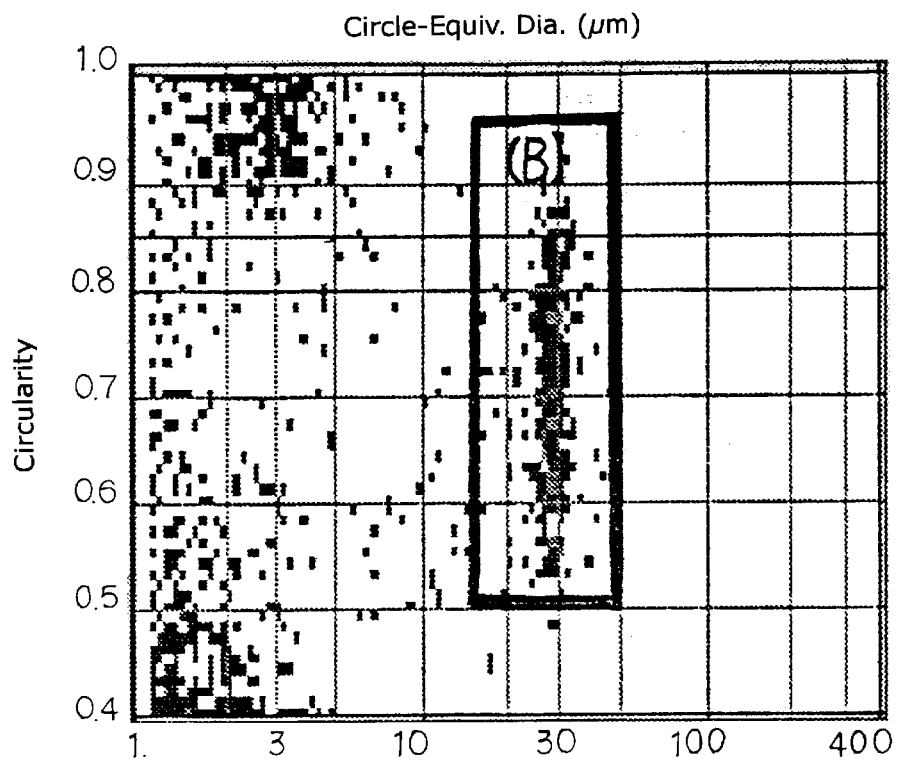
FIG. 7 is an example of a scattergram generated in the embodiment based on characterizing parameters.

Then, FIG. 7 depicts displayed a distribution diagram (scattergram) prepared by measuring the same alumina particles as those set forth above, based on particle diameter (circle-equivalent diameter) and circularity as characterizing parameters. Area (B) enclosed in the bold line is a designated area. The analytical results wherein analytical area (B) is designated distinguish a distribution area in which the mean particle diameter (arithmetic mean)=29.38, the particle diameter SD (standard deviation)=3.46, the 50% diameter (50% percentile)=29.58, the average circularity (arithmetic mean)=0.702, the circularity SD (standard deviation)=0.086, the 50% circularity (50% percentile)= 0.70, and in which a comparatively slight dispersed particle diameter (circle-equivalent diameter) dominates, and particles of small circularity are concentrated.

Figure 8:
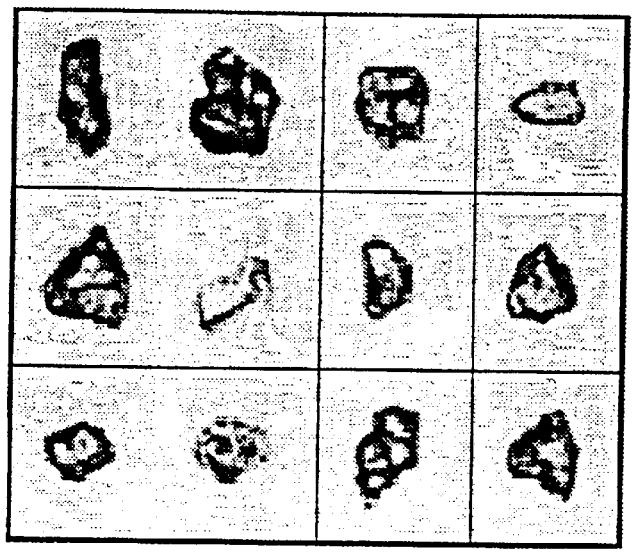
FIG. 8 depicts particle pictures from area (B) in the embodiment.

FIG. 8, moreover, depicts particle pictures when area (B) in FIG. 7 is designated. It is clear that, according to the selected scattergram, large particle diameter (circle-equivalent diameter), angular (small-circularity) particle images are exhibited most.

Utilizing the present invention, particle images thus corresponding to distribution diagrams can be displayed at will, which therefore facilitates analyzing particles that turn out to be the cause of anomalies on the distribution, and serves in the development of powder products and in product quality control at the factory.

In addition, the present inventive product is further provided with classifying means for tagging category information expressing particle types for the respective particle images (step S9). That is, utilizing the input unit 13, users can manually categorize the displayed images. Users designate primary (isolated) particle images, bi-particle aggregation images, tri-particle aggregation images, higher-order particle aggregation, or off-target particles. Based on the designation results, the ratios of the numbers of particles that are aggregated can be calculated automatically.

Various details of the present invention may be changed without departing from its spirit nor its scope. Furthermore, the foregoing description of the embodiments according to the present invention are provided for illustration only, and not for the purpose of limiting the invention as defined by the appended claims and their equivalents.

What is claimed is:

1. A particle image analyzer, comprising:

parameter computation means for computing at least one morphologically characterizing parameter for respective particle images obtained by image capture;

storing means for storing particle images, morphologically characterizing parameters, and correlations between the particle images and the morphologically characterizing parameters with regard to the respective particle images;

distribution-diagram generation means for generating a distribution diagram for morphologically characterizing parameters;

designation means for designating an area within the distribution diagram;

read-out means for selectively reading out from the storing means particle images corresponding to morphologically characterizing parameters within the area designated by the designation means; and display means for selectively displaying the read-out particle images.

2. The particle analyzer set forth in claim 1, wherein the distribution diagram is for one morphologically characterizing parameter.

3. The particle analyzer set forth in claim 2, wherein the distribution diagram is for at least one morphologically characterizing parameter selected from particle diameter, circularity, and aspect ratio.

4. The particle analyzer set forth in claim 1, wherein the distribution diagram is for two morphologically characterizing parameters.

5. The particle analyzer set forth in claim 4, wherein the distribution diagram is for at least two morphologically characterizing parameters selected from particle diameter, circularity, and aspect ratio.

6. The particle analyzer set forth in claim 1, further comprising distribution analyzing means for analyzing distribution status of the morphologically characterizing parameters within the area designated by the designation means to display the analysis results in the display means.

7. The particle analyzer set forth in claim 6, wherein the morphologically characterizing parameter is at least one selected from particle diameter, circularity, and aspect ratio.

8. The particle analyzer set forth in claim 1, further comprising classifying means for appending classification information indicating particle type to the respective particle images.

9. A particle image analyzer, comprising:

a parameter computation device being configured to compute at least one morphologically characterizing parameter for respective particle images obtained by image capture;

a memory device to store particle images, morphologically characterizing parameters, and correlations between said particle images and said morphologically characterizing parameters with regard to said respective particle images;

a distribution-diagram generator being configured to generate a distribution diagram for said morphologically characterizing parameters;

a designator being configured to designate an area within said distribution diagram;

a reader being configured to read out selectively from said memory device particle images corresponding to morphologically characterizing parameters within said area designated by said designator; and a display being configured to display selectively said particle images read out from said reader.

10. The particle analyzer according to claim 9, wherein said distribution diagram is for one morphologically characterizing parameter.

11. The particle analyzer according to claim 10, wherein said distribution diagram is for at least one morphologically characterizing parameter selected from particle diameter, circularity, and aspect ratio.

12. The particle analyzer according to claim 9, wherein said distribution diagram is for two morphologically characterizing parameters.

13. The particle analyzer according to claim 12, wherein said distribution diagram is for at least two morphologically characterizing parameters selected from particle diameter, circularity, and aspect ratio.

14. The particle analyzer according to claim 9, further comprising a distribution analyzer that is configured to analyze distribution status of said morphologically characterizing parameters within said area designated by said designator to display said analysis results in said display.

15. The particle analyzer according to claim 14, wherein said morphologically characterizing parameter is at least one selected from particle diameter, circularity, and aspect ratio.

16. The particle analyzer according to claim 9, further comprising a classifier that is configured to append classification information indicating particle type to respective particle images.

* * * * *